Jan. 28, 1930.  G. J. W. PIPIRS  1,745,188
DRAWING INSTRUMENT
Filed Sept. 7, 1928
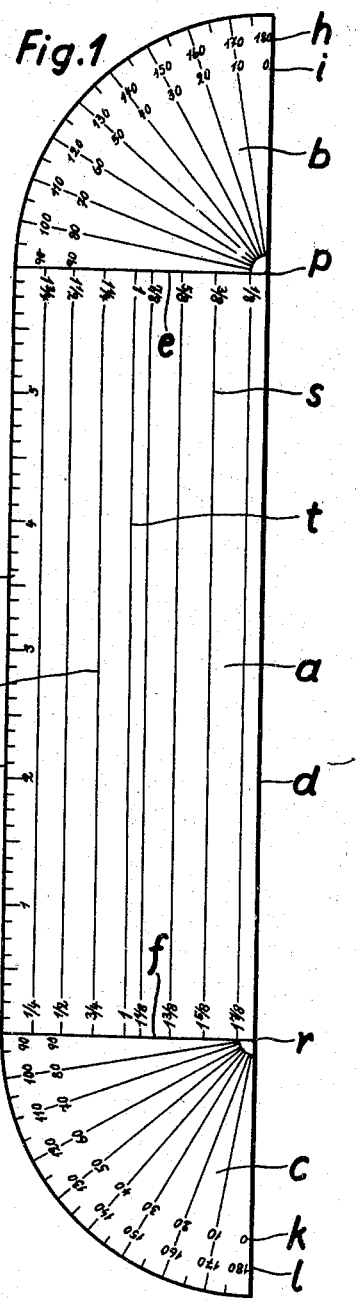
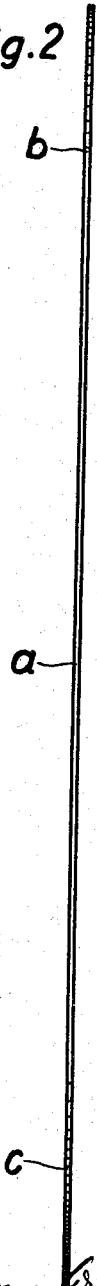

Patented Jan. 28, 1930

1,745,188

UNITED STATES PATENT OFFICE

GERHARD JOHANNES WILHELM PIPIRS, OF GUMBINNEN, GERMANY

DRAWING INSTRUMENT

Application filed September 7, 1928, Serial No. 304,493, and in Germany April 28, 1926.

My invention relates to a drawing instrument which although of simple construction is exceedingly useful and serves many purposes for which hitherto several or combination drawing instruments had to be used.

With these and other objects in view, the invention consists of certain novel features of construction and combination as hereinafter described and particularly pointed out in the appended claim and shown in the drawings illustrating the preferred embodiment of the invention.

Figure 1 is a plan view of the drawing instrument embodying my invention.

Figure 2 is a side view.

Similar letters refer to similar parts throughout both views.

The drawing instrument consists of a piece of transparent material on which is printed on its reverse or lower side a scale or graduated measure with the figures denoting the units of measurement inverted so that they may be correctly and without difficulty read from above.

The instrument is subdivided through the lines marked $e$ and $f$ in the rectangular middle part $a$ and the two quadrants $b$ and $c$.

The middle part $a$ serves with its edges $d$ and $g$ as a ruler for drawing lines. It is divided through a number of lines marked $s$, $t$, $u$, etc., running parallel to the edges $d$ and $g$ into parallel sections for the purpose of making the drawing of parallel lines possible. With this aim in view the lines on the drawing instrument marked $s$, $t$, $u$, etc., run at certain distances from one to another and from the edges $d$ and $g$. From the latter the lines $s$, $t$, $u$, etc., run at different distances so that parallel lines can be drawn at the different distances required.

With the drawing instrument before a user so that edge $g$ is farthest from him, if the instrument is to be used to draw parallel lines, the figures on the left side of lines $s$, $t$, $u$, etc., give the distances of these lines from the edge $g$. For instance: the line marked ¾ is ¾″ distant from the edge $g$. If the drawing instrument is now turned so that the edge $d$ is above and is used for drawing lines, it is evident that the line marked $u$ is 1¼″ distant from the edge $d$. In the same way the distances of all other lines from the upper edge, be it $d$ or $g$, can be seen at a glance.

If a line is to be drawn parallel to and at a certain distance from an already existing line, the drawing instrument is laid on to the drawing in such a way that the already existing line is covered by the line of the drawing instrument, $s$, $t$, $u$, or any other, which on its left is marked with the distance required and the parallel line is then drawn along the upper edge, this may be $d$ or $g$. If for instance a distance of ⅜″ is required, line $s$ in connection with edge $d$ is to be used. For a distance of ¾″ line $u$ in combination with edge $g$. For a distance of 1¼″ line $u$ in combination with edge $d$. For a distance of 1⅝″ line $s$ in combination with edge $g$. For a distance of 1″ line $t$ can be used in combination with either edge $d$ or $g$, because line $t$ has in the illustrated embodiment the same distance from both edges.

The edge $g$ of division $a$ is also provided with a suitable measuring scale which serves the same purposes as measuring scales on other rulers i. e. for measuring distances.

If to an existing line or the edge of a sheet of paper a line at a right angle is to be drawn line $e$ or $f$ of the drawing instrument is placed on the existing line or the edge of the paper and the desired line can then be drawn either along the edge $d$ or $g$ of the drawing instrument.

The two quadrants $b$ and $c$ are for measuring and drawing angles and are therefore provided with two different scales marked $h$ and $i$ on one and $k$ and $l$ on the other quadrant. The following examples will explain their use:

For measuring an acute angle either quadrant $b$ or quadrant $c$ can be used. One extension of the edge $d$ beyond the points marked $p$ or $r$ is placed in such a way on one of the legs of the acute angle to be measured that it coincides with it and that the point $p$ or $r$ lies exactly over the vertex of the angle. The dimension of the angle can then be read from the graduated scale $i$ or $k$.

In the same way, obtuse angles are measured with this difference: one of the legs of the obtuse angle to be measured is made to coincide with the edge $d$ of the middle section $a$, and the dimension of the angle is read from one of the graduated scales $h$ or $l$.

If from an already existing line another line is to be drawn at a given acute angle, it depends on which side of the existing line the new line is to be drawn, and accordingly either quadrant $b$ or $c$ is used. The dimension of the angle is read from one of the graduated scales $i$ or $k$ and the corresponding radius placed above the existing line in such a way that the point from which the new line is to be drawn, the vertex of the angle, is covered by either point $p$ or $r$. The line required is then drawn along the extension of the edge $d$ beyond the rectangular middle part $a$.

In a similar way a line at an obtuse angle can be drawn to an already existing line, with this difference: one of the graduated scales $h$ or $l$ is to be used and the line required is to be drawn along the edge $d$ of the middle section $a$ lying between the points marked $p$ and $r$.

I wish it to be understood that I do not desire to be limited to the exact details of construction shown and described, for obvious modifications will occur to a person skilled in the art.

What I claim is:

An instrument of the character described made of transparent material, comprising a rectangular-shaped ruler and quadrants with graduated scales for measuring angles extending from either short side of the rectangular ruler and whose other bounding radii are straight extensions of one of the edges of the ruler.

In testimony whereof I affix my signature.

GERHARD JOHANNES WILHELM PIPIRS.